April 23, 1946.  E. E. LIBMAN ET AL  2,398,904
MEASURING DEVICE
Filed July 30, 1943  3 Sheets-Sheet 1
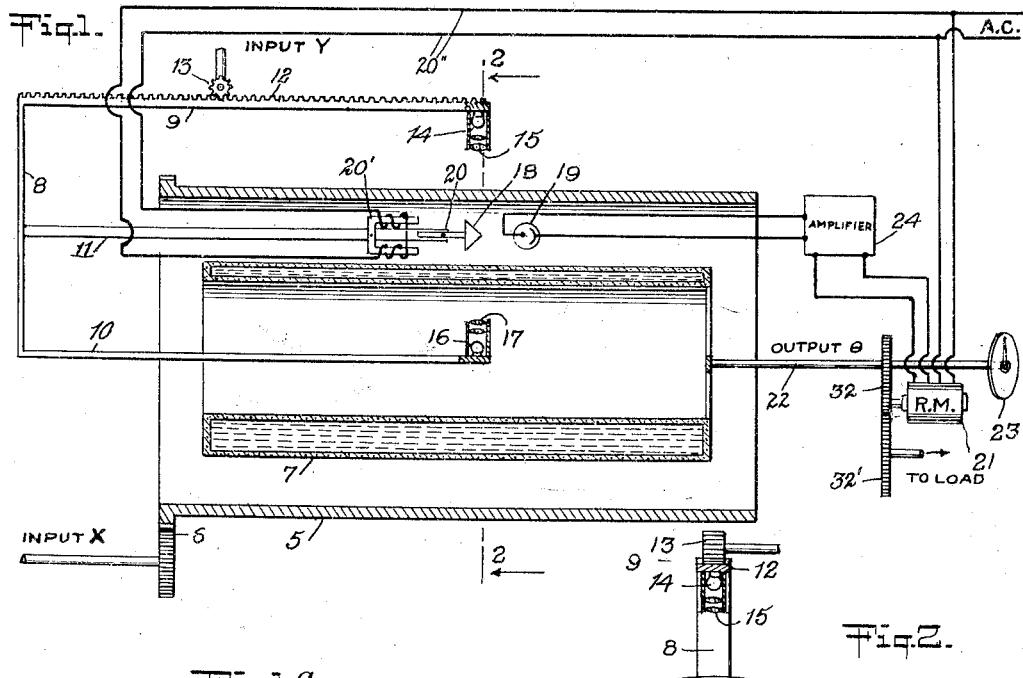
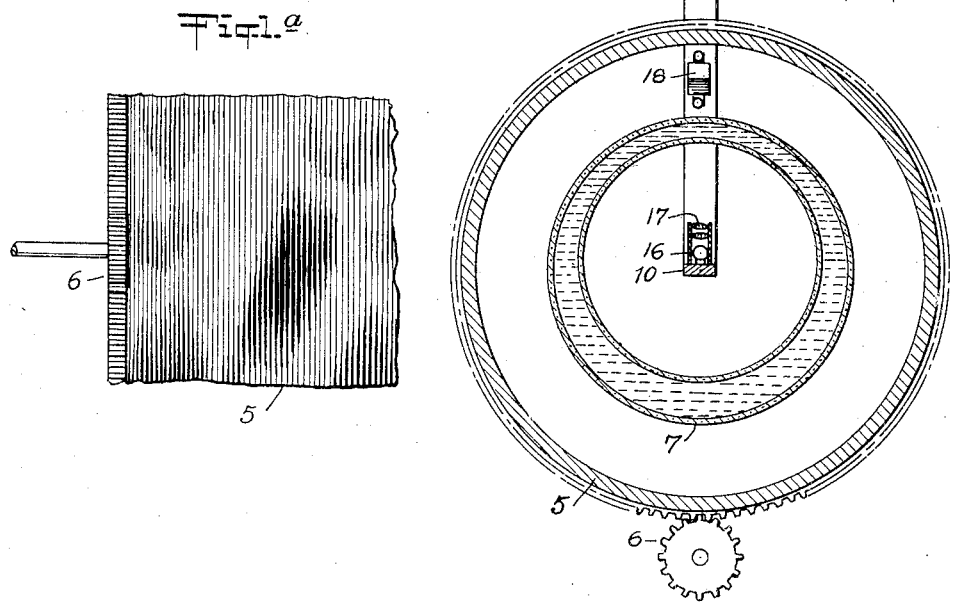
INVENTORS
Earl E. Libman
and Henry Lehde
BY
Edward L. Mueller
Attorney April 23, 1946.　　　E. E. LIBMAN ET AL　　　2,398,904
MEASURING DEVICE
Filed July 30, 1943　　　3 Sheets-Sheet 2

INVENTORS
Earl E. Libman
and Henry Lehde
BY
Edward L. Mueller
Attorney

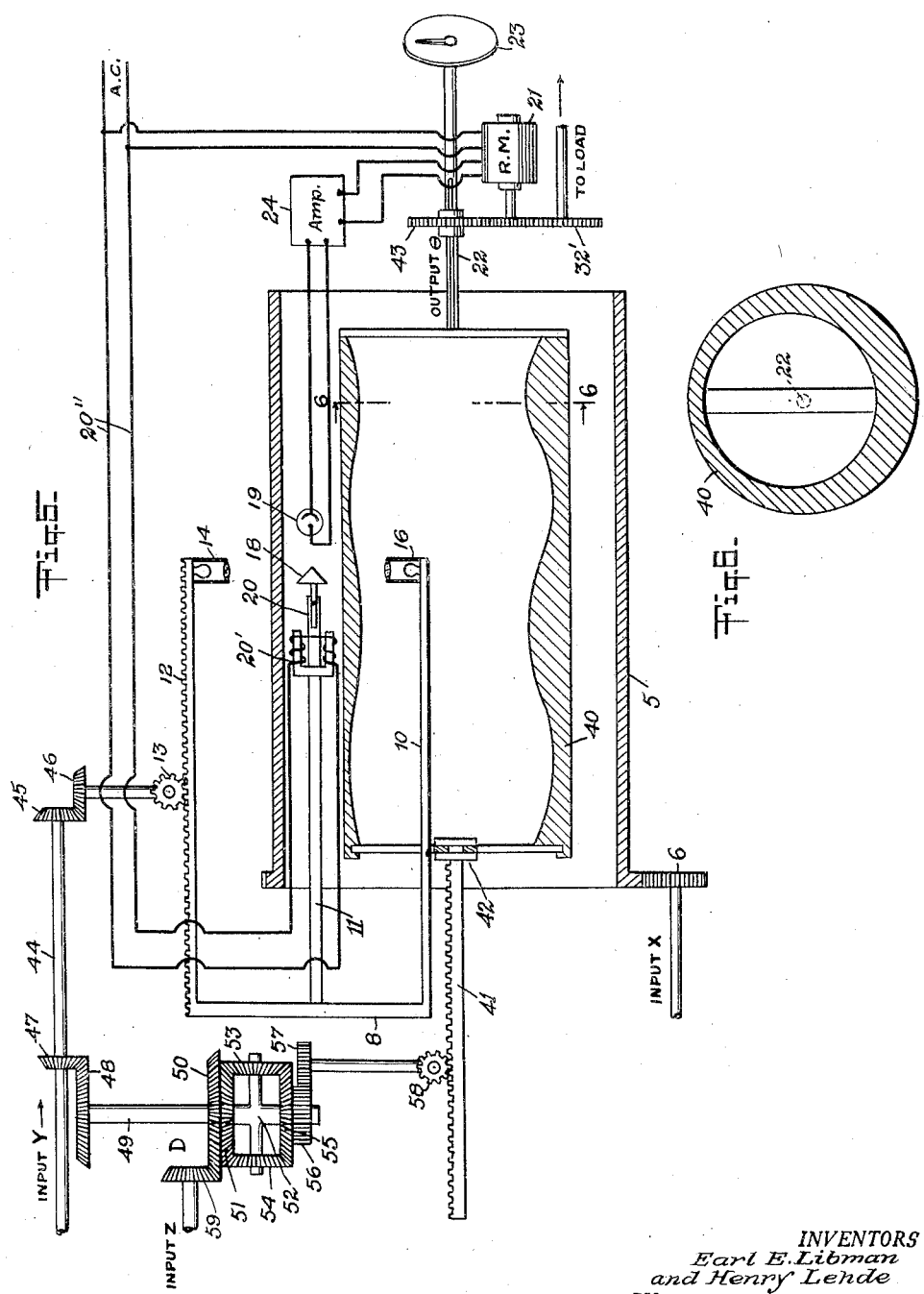

Patented Apr. 23, 1946

2,398,904

UNITED STATES PATENT OFFICE 2,398,904

MEASURING DEVICE

Earl E. Libman and Henry Lehde, Brooklyn, N. Y., assignors to Control Instrument Company, Inc., Brooklyn, N. Y., a corporation of New York Application July 30, 1943, Serial No. 496,735

27 Claims. (Cl. 250—41.5)

This invention relates to improvements in computing devices and has particular reference to a device employing optical means.

Generally, the present invention is designed for the purpose of computing, indicating, and/or delivering under power, a desired quantity which is determined in value by a function of two or more other variable input quantities, this being done in such a manner that when the variable input quantities are fed into the device said inputs determine the value of the desired output quantity. Thus, when two variable input quantities ($x$ and $y$ for example) are employed to determine a desired output quantity, $\theta$, a function of said variables is expressed by $\theta = F(x, y)$, where $F(x, y)$ is any desired function. Obtaining the output value on a suitable indicator, or on a shaft under power, may be accomplished electrically, mechanically, or otherwise.

Heretofore, measurements or indications of this nature have been accomplished by the use of space cams, well-known in the art. With such a cam, one input quantity represented by a mechanical motion proportional to the given variable quantity $x$ may determine the angular or rotative position of the cam, while the other quantity likewise represented by a mechanical motion proportional to the given variable quantity $y$ positions a follower riding on the cam, the value of the quantity $z$ to be determined being obtained from the rise of the follower riding on the cam.

In accordance with the present invention, it is proposed to substitute for the well-known space cam, a member, hereinafter referred to as an "optical cam," which may be a cylinder, disc, tape, or other equivalent and which may take the form of a sheet of material having a variable light modulating or affecting characteristic, such as translucency or the like, throughout its area, which characteristic, at any point of the area, has a value determined by any two or more coordinates locating that point on the area.

A feature of the invention is to measure a desired output as a function of variable inputs by utilizing the latter to select a point of the light affecting or modulating element, such as the mentioned cam, which has different light modulation characteristics at different points thereof, and determining the modulating characteristics of the selected point.

A further and more specific feature is to employ the optical cam, or its equivalent, in measuring a desired output quantity as a function of two or more variable inputs, one of which drives said cam, by varying the position of a translucent element of different translucency characteristics from said cam and corresponding to the output quantity to be measured, relative to the position of said cam until light rays positioned by another input quantity or quantities pass through said cam and translucent element with matched intensity.

The inventive idea involved is capable of receiving a variety of expressions some of which, for purposes of illustration only, are shown in the accompanying drawings; but it is to be expressly understood that said drawings are employed merely for the purpose of describing the invention as a whole and not to define the limits thereof, reference being had to the appended claims for this purpose.

In the drawings:

Fig. 1 is a view, partly in section and partly in diagram, illustrating one adaptation of the present invention.

Fig. 1a is an elevation of a portion of the cam surface, showing variations in the light modulating or light affecting characteristics thereof.

Fig. 2 is a section on the line 2—2 of Fig. 1.

Fig. 3 is a view similar to Fig. 1, showing another modification of the invention.

Fig. 4 is a view similar to Fig. 1, illustrating a third modification that may be used when the reflective power of the optical cam is employed as the light modulating characteristic which determines the output quantity.

Fig. 5 is a similar view of a fourth modification in which the output quantity is determined as a function of three variable input quantities, and Fig. 6 is a section on the line 6—6 of Fig. 5.

In the mechanical embodiment shown in Figs. 1 and 2, the optical cam 5 is in the form of an open-ended cylinder having translucent or other light affecting or modulating characteristics which vary arbitrarily from point to point and in different directions in the zone thereof. Said cam is rotated by the input $x$ through gearing 6, and has a light modulating characteristic determined at each point by the two variables (as for example the rotation and distance along the axis) locating that point on the cam. Within said cam is axially arranged a rotatable member 7 known as an optical wedge. Said wedge may take various forms and can be made of glass and constructed with inner and outer walls which are eccentrically disposed, thereby providing a space or chamber therebetween the cross sectional area of which varies circumferentially and constantly from minimum to maximum and back to minimum, but does not vary in an axial direction, so that when the chamber is filled with a substance such as gelatin, the relative degree of translucency of the wedge throughout its zone is altered as it is rotated through a stationary beam of light. Said wedge also may be a cylinder whose light modulating characteristics are obtained by photographic deposition.

Mounted for longitudinal adjustment relative to the cam 5 and wedge 7 is a supporting member 8 comprising the upper and lower arms 9 and 10 and an intermediate arm 11. Said arm 9 extends outside the cam 5 and is provided with rack teeth 12 for engagement by the pinion 13 driven by the input $y$, and at the free end of said arm it carries a source of illumination such as the lamp 14 having associated therewith the focusing lenses 15. The arm 10, which extends into the wedge 7, likewise carries a lamp 16 and lens system 17 positioned opposite the lamp 14, while on the inner free end of the arm 11, which is positioned between the cam 5 and wedge 7, there is mounted a reflecting member 18 which may be in the form of a prism arranged in opposed relation to said lamps and in operative association with a photoelectric cell 19.

In this form of the invention, the reflector 18 is caused to vibrate as the beams of light from the lamps 14 and 16 strike its reflecting surfaces after passing, respectively, through the cam 5 and wedge 7. This vibration of the reflector is accomplished by any suitable means. As illustrated, said means comprises a permanent magnet 20 carrying the reflector 18 and pivoted so that it can oscillate on the arm 11. An alternating current magnet 20' is fixed on said arm in cooperative relation to the magnet 20 and causes it and the reflector to oscillate when the magnet 20' is energized from the line conductors 20'' connected to a source of alternating current supply. This oscillation is in synchronism with said supply source and results in the light from the lamps 14 and 16 being alternately directed to the photocell 19 which is connected to a follow up system including a reversible two-phase motor 21. Any inequality in the relative amounts of light reaching the cell 19 from said sources 14 and 16 will produce, due to oscillations of the reflector, a pulsating current in said cell whose phase is determined by the relative magnitude of the amounts of light reaching the cell from each source. This current is amplified by any suitable amplifier conventionally shown at 24 and the amplified current is fed to one phase of said motor, while the other phase is energized from the conductors 20''. The phase of the pulsating light intensity and of the resulting amplified current depends upon whether the wedge 7 is transmitting light of greater or less intensity than the cam 5, and determines the direction in which the motor 21 will run. As long as the above mentioned inequality in intensity exists, said motor will run and, through the shaft 22 and gearing 32, will rotate the wedge 7 to a position where the amounts of modulated light reaching the cell 19 are equal or matched, whereupon a pulsating component in the output of said cell is no longer present and the motor stops. An indicator 23 may be controlled by the shaft 22 to then indicate the output $\theta$ in accordance with the position of the wedge 7. Additional gearing 32' can be also driven from the motor 21 to actuate any additional mechanism, as indicated. The size and characteristics of the amplifier and motor are determined by the load imposed by such additional mechanism.

As an alternative form, instead of employing the two lamps 14 and 16, the vibratory prism 18 and one photoelectric cell 19, there may be used two photo cells, a stationary reflector and one lamp. Such an arrangement is shown in Fig. 3 wherein the optical cam 5 and wedge 7 are mounted and operate as described in connnection with Figs. 1 and 2.

In this form, the reflector 26 is rigidly carried by the arm 11 of the supporting member 8 and is located between the cam 5 and wedge 7. In place of the lamps 14 and 16 of Fig. 1, photoelectric cells 27 and 28, with associated lenses, are mounted, respectively, on the upper and lower arms 9 and 10. Thus the reflector 26 and said photoelectric cells are moved as a unit when the supporting member 8 is longitudinally adjusted by the pinion 13 controlled by the input $y$. Associated with the reflector 26 is a source 29 from which light is projected toward the reflector and is divided thereby into two beams of equal intensity, one of said beams passing through the cam 5 and to the photoelectric cell 27, while the other beam passes through wedge 7 and to the cell 28. Said source 29 is energized by an alternating current source at a frequency $f$. Each cycle of the alternating current wave will produce a pulse of light corresponding to both the negative and positive peaks of the wave, while a minimum amount of light will correspond to zero current. As is well konwn, the light emitted by the light source will then pulsate at the frequency $2f$, or double the frequency $f$. At any given point of rotation of the cam 5 determined by input $x$ or longitudinal adjustment of the supporting member 8 determined by input $y$, wherein the reflected light passes through the cam and wedge with unequal intensity due to the difference in light modulation characteristic or translucency at said point, the amount of light reaching the cells 27 and 28 will also be unequal, and consequently these cells will have different characteristics caused by said inequality. As shown, the cells 27 and 28 are connected to any appropriate bridge circuit including the resistances R1 and R2, and are energized by the battery B. The output of the bridge circuit is amplified at 24 and will contain an alternating current whose phase is dependent upon which of the photocells 27 or 28 has a greater amount of light falling upon it. The amplified output of the bridge circuit is connected to one phase of the two-phase motor 31 and the other phase of the latter is energized from an alternating current source of twice the frequency of the supply for the light source 29. A fixed phase relationship must be maintained, by any suitable means well known in the art, between the alternating current supply for the source 29 and the supply which energizes the reversible motor 31. The phase of the amplified bridge output and the relative light modulating effects of the cam 5 and wedge 7 will thus determine the magnitude and direction of current controlling the motor 31 and therefore the direction and velocity thereof. Said motor, being geared at 32 to the shaft 22, will rotate the wedge 7 until it is in a position where its translucency matches that of the cam 5. At this position, the amount of light falling upon the two photoelectric cells is equal and the output of the bridge circuit disappears and the motor stops. Thus the rotation of the motor 31, and consequently of the shaft 22, is a measure of the translucency of the optical cam and therefore of the desired quantity θ.

In the form of the invention shown in Fig. 4, the optical cam comprises a cylinder 34 whose surface, as shown, has a variable light reflecting power throughout its area and this power, at any point, is determined by the variables $x$ and $y$ locating that point on the surface. The optical wedge 35, employed to measure the reflecting power of the cam 34, is also in the form of a cylinder and, like the translucency characteristics of the wedge 7 of the other forms of the invention thus far described, its reflecting power varies uniformly around its circumference, but does not vary in an axial direction. The reflecting effect of the wedge 35 may result from varying the polish from reflecting to matt around the circumference of the cylinder, by means of sand blasting, controlled polishing, or other methods.

In the present form, the input $x$ is connected, by the gearing 36, to the shaft 37 of the cam 34 so as to rotate the latter. The optical assembly, including the reflector 26, two photoelectric cells 27 and 28, and the source of light 29, energized as described in connection with Fig. 3, is arranged in the space between cam 34 and wedge 35 and is movable as a unit by being mounted upon the rack bar 38 which is equivalent to arm 12 in the other forms of the invention, and said bar is moved linearly by the pinion 13 connected to the input $y$. A T-shaped light shield 39 optically separates the photoelectric cells 27 and 28 from each other and directly from the reflector 26 so that said cells will only receive reflected light from the cam 34 and wedge 35. Thus, rays of light from the source 29 are divided into two equal beams by the reflector 26 and are directed by the latter against opposite points on said cam and wedge, and the light reflected by the cam falls on the photoelectric cell 27 while that reflected by the wedge strikes the cell 28. As in Fig. 3, the cells 27 and 28 are connected in a suitable bridge circuit including the resistances R1 and R2 and battery B and to which is connected the amplifier 24 so that when the relative amounts of reflected light from the cam 34 and wedge 35 are unequal, the bridge circuit is unbalanced and the amplified output causes the reversible motor 31 to rotate the wedge 35 until its reflective power is equal to that of the cam 34 at the points where reflected light from the reflector 26 strikes said elements. Since the reflecting power of the wedge 35 varies uniformly around its circumference, its rotation to a point of balance with the cam 34 is a measure of the reflecting power of said cam or, in other words, of the desired quantity θ determined by the inputs $x$ and $y$.

The embodiment of the invention shown in Fig. 5 provides an arrangement whereby an output quantity θ may be determined as a function of three independent variable input quantities $x$, $y$ and $z$, and is also suitable for determining said output as a function of the two variables $x$ and $y$ only. As in Figs. 1 and 3, the optical cam 5 is controlled by the input $x$, and the parts including the light sources 14, 16, the reflector 18, cell 19, amplifier 24 and motor 21, function exactly as described in connection with Fig. 1. However, the optical wedge 40 differs from wedge 7 in that its light modulating characteristics vary both circumferentially and in an axial direction by making the inner wall of the wedge of variable character and in accordance with the third input $z$. Further, the wedge 40 is not only rotated by the motor 21 but is also moved axially under the control of the latter input, as will presently appear, by having the rack 41 swivelly connected to one end of the wedge, as at 42, so as not to hinder its rotative movement, and by having the shaft 22 at the other end of the wedge splined in the gear 43 driven by the motor 21.

In the present form, the portion of the optical assembly carried by the linearly movable frame 8 is driven by the input $y$ through the shaft 44 which drives the gears 45, 46 connected to the rack and pinion 12, 13, and said input $y$ and the third input $z$, are applied through the medium of a differential generally indicated at D so as to obtain proper correspondence of the wedge 40 and said optical assembly. Thus, as only said input $y$ drives said assembly it, at the same time, moves the wedge an equal distance in an axial direction in the following manner. As the shaft 44 is rotated, it drives the gears 47, 48 which rotate the shaft 49. Said shaft extends loosely through gears 50 and 51 to drive the spider 52 of the differential, and the idler gears 53 and 54 are driven by the rotation of the spider to rotate the gears 55, 56 as a unit. Through the gear 57 meshing with the gear 56 and the pinion 58 engaging the teeth of the rack 41, the latter is moved linearly to adjust the wedge 40 in an axial direction. The gearing thus far described is so proportioned that said wedge and the frame 8 are moved the same amounts by the input $y$, thus maintaining a fixed linear relationship between the wedge 40 and the optical assembly, and the desired output will then depend upon the light modulation characteristic of the cam 5 at the given point. However, when a third input $z$ is introduced, the gear 59 driven thereby turns the gears 50, 51 independently of the shaft 49 with the result that the idler gears 53, 54 will drive the gears 55, 56 and, through the rack 41, the wedge 40 will thus be moved axially by said input $z$ and relative to the optical assembly to vary its modulating effect with respect thereto. Therefore, the desired output θ will be determined as a function of the three inputs $x$, $y$ and $z$.

A method of constructing the optical cam may consist in forming the cylinder of translucent material with a light sensitive covering, or making the same of sensitized material, and placing the cylinder in the position shown in Fig. 1 except that the reflector 18, lamp 14 and photocell 19 are not required. Then, the two input shafts $x$ and $y$ are geared so that when the former is turned, the latter will also turn through $kx$, where $k$ is an arbitrary constant. Therefore, $y=kx$ and the equation $θ=F(x, y)$ becomes $θ=F(x, kx)$ and θ is then a function of $x$ only. Consequently, a flat cam, or any other means for measuring θ as a function of $x$, may be used to control the output shaft θ and the optical wedge to which it is connected. Maintaining the inside source of light at a uniform intensity, the input shaft $x$ is turned to cause the $y$ and θ shafts to turn so that said light will pass through the wedge 7 and scan the sensitized surface of the optical cam over a helix the step of which depends upon the constant $k$. The amount of light reaching said surface is determined by the angle of rotation of the optical wedge so that upon development of the cam, after exposure to said light, it will have at each point throughout its surface a translucency equal to the value of θ corresponding to and varying with the value of the inputs $x$ and $y$ at that point. A cam so constructed, if used with the optical wedge employed during its construction, will function without regard to the characteristics of said wedge so long as the latter varies constantly from minimum to maximum translucency. A similar method can be used to generate an optical cam employing light reflecting characteristics.

It is obvious that simplified methods, such as employing a photocell to directly measure transmitted or reflected light, may be used if accuracy is not required. Other light modulating characteristics, such as polarization, or color variations, may also be employed to establish the output $\theta$.

What is claimed is:

1. In combination, a light modulating element having different modulation characteristics at different points thereof, a second light modulating element associated with the first named element, light sensitive means responsive to the modulation characteristics of said elements, variable mechanical input means to move one of said elements relative to said light sensitive means, and other mechanical means to move the other modulating element until the modulation characteristics of both modulating elements affecting said light sensitive means are of matched intensity.

2. In combination, two elements of different translucency characteristics arranged in cooperative relation for the passage of rays of light therethrough, a reflecting medium, means to pass rays of light through said elements onto said reflecting medium, variable mechanical input means to effect relative movements between one of said translucent elements and said light ray means, and means responsive to inequalities of light rays reaching said reflecting medium through said translucent elements to move the other of said translucent elements relative to the first named element until said rays pass through said elements with matched intensity.

3. In combination, two rotatable elements of different translucency characteristics arranged for the pasasge of light rays therethrough, a light reflecting medium, means to pass rays of light through said elements onto said reflecting medium, variable mechanical input means to effect relative movements between one of said translucent elements and said light ray means, and means responsive to the relative intensities of light rays reaching said reflecting medium through said translucent elements to rotate the other of said elements relative to the first named element until said rays pass through said elements with matched intensity.

4. In combination, two relatively movable elements of different translucency characteristics arranged for the passage of light rays therethrough, variable mechanical input means to move one of said elements relative to the other, an optical system including light ray means and a reflecting medium associated with said elements, other variable input means to move said optical system relative to both of said elements, and means responsive to the relative intensities of light rays reaching said reflecting medium through said translucent elements to move said other element relative to the first named element until matching of light intensities passing through said elements is attained.

5. In combination, an optical wedge and an optical cam having different translucency characteristics and arranged in cooperative relation for the passage of light rays therethrough, means to reflect light rays passing through said wedge and cam, variable mechanical input means to effect relative movements between one of the latter elements and said reflecting means and between the last named means and said wedge and cam, and means responsive to inequalities in intensity of light rays reaching said reflecting means through said wedge and cam for moving the other of the latter elements relative to the first mentioned one thereof until the light intensities through both said elements are matched.

6. In combination, an optical wedge and an optical cam having different light modulating characteristics and arranged in cooperative relation to modulate light rays reaching the same, a reflector for such light rays, variable mechanical input means to move said optical cam relative to said wedge, other variable input means to move said reflector relative to said wedge and cam, and means responsive to the relative intensities of light rays reaching said reflector through said wedge and cam to move the former relative to the latter until matching of light intensity is attained.

7. In combination, an optical wedge and an optical cam having different translucency characteristics and arranged one within the other for the passage of light rays therethrough, a reflector between said wedge and cam, means to move said reflector relative to said wedge and cam, means to move one of the latter elements relative to the other, means to project light rays through said wedge and cam and means responsive to the relative intensities of light rays reaching said reflector through said wedge and cam to move the other of the latter elements until matched intensity is attained.

8. In combination, an optical wedge and an optical cam having different translucency characteristics and arranged one within the other for the passage of light rays therethrough, a reflector between said wedge and cam, means to linearly move said reflector relative to said wedge and cam, means to rotate said cam relative to said wedge and reflector, means to project light rays through said wedge and cam and means responsive to the relative intensities of light rays reaching said reflector through said wedge and cam to rotate said wedge until matching of light intensity is attained.

9. In combination, a cylindrical optical wedge and a cylindrical optical cam one arranged within the other and both having different translucency characteristics, a reflector disposed between said wedge and cam, two sources of light one within said wedge and the other exteriorly of said cam, means to move said reflector and sources linearly relative to said wedge and cam, means to rotate said cam relative to said wedge, and means responsive to the relative intensities of light from said sources passing through said wedge and cam and reflected by said reflector for rotating said wedge relative to said cam until the intensities of light passing through said wedge and cam and reaching said reflector are matched.

10. In combination, two elements of different translucency characteristics arranged in cooperative relation for the passage of rays of light therethrough, a reflecting medium, means to pass rays of light through said elements onto said reflecting medium, variable mechanical input means to effect relative movements between one of said translucent elements and said light ray means, photoelectric means having impedances connected thereto and being responsive to the light rays reaching said reflecting medium through said translucent elements, and means controlled by the impedances of said photoelectric means to move the other of said translucent elements relative to the first named element until said rays pass through both of said elements with matched intensity.

11. In combination, two rotatable elements of different translucency characteristics arranged for the passage of light rays therethrough, a light reflecting medium, means to pass rays of light through said elements onto said reflecting medium, variable mechanical input means to effect relative movements between one of said translucent elements and said light ray means, photoelectric means having impedances connected thereto and being responsive to the light rays reaching said reflecting medium through said translucent elements, and a reversible motor controlled by the impedances of said photoelectric means to rotate the other of said translucent elements relative to the first named element until said light rays are reflected onto said photoelectric means with matched intensity.

12. In combination, two movable elements of different translucency characteristics arranged for the passage of light rays therethrough, a stationary reflector positioned between said elements, a light source in association therewith, variable mechanical input means for effecting relative movements between one of said translucent elements and said light source, two photoelectric cells responsive to the relative intensities of light rays passing from said reflector through said translucent elements, and means responsive to the impedances of said cells to move the other of said translucent elements relative to the first named element until the outputs of said cells are equal.

13. In combination, two movable elements of different translucency characteristics arranged for the passage of light rays therethrough, a stationary reflector positioned between said elements, a light source in association therewith, variable mechanical input means for effecting relative movements between one of said translucent elements and said light source, two photoelectric cells responsive to inequalities of light rays passing from said reflector through said translucent elements, and means including a reversible motor controlled by variations in the impedances of said cells to move the other of said translucent elements relative to the first named element until the outputs of said cells are matched.

14. In combination, two elements of different light modulating characteristics arranged in cooperative relation to modulate rays of light reaching the same, a stationary reflector between said elements, light sensitive members in opposed relation to said reflector and each associated with one of said elements on the side thereof opposite said reflector so as to receive reflected rays of light from the latter after said rays have been modulated by the associated element, variable mechanical input means to relatively move one of said elements and said reflector and light sensitive members, and means responsive to the relative intensities of light rays reaching said light sensitive members for moving the other of said modulating elements relative to the first named element until said rays pass through said elements with matched intensity.

15. In combination, two elements having surfaces of different light reflecting characteristics, mechanical input and output means each moving one of said elements relative to the other, an optical assembly positioned between said elements and including a light reflector and light sensitive members for receiving reflected rays of light from said surfaces, other input means for moving said optical assembly relative to said light reflecting elements, and means controlled by said light sensitive members for operating said output means until the reflected light from said reflecting elements reaches said light sensitive members with matched intensity.

16. In combination, two light modulating elements having different modulation characteristics at different points ranging both circumferentially and axially thereof, light sensitive means responsive to the modulation characteristics of said elements, and a plurality of mechanical means variably operable to effect relative movements between said modulating elements and light sensitive means until the modulation characteristics of both said elements affecting said light sensitive means are of matched intensity.

17. In combination, light modulating elements including an optical cam having different modulation characteristics at different points ranging both circumferentially and axially thereof, an optical wedge having modulation characteristics similar to those of said cam, light sensitive means responsive to the modulation characteristics of said elements, and a plurality of mechanical means variably operable to effect relative movements between said modulating elements and light sensitive means until the modulation characteristics of both said elements affecting said light sensitive means are of matched intensity.

18. In combination, two elements of different light modulation characteristics, an optical system associated with said elements and including means for projecting rays of light toward the same, variable mechanical input means to effect relative movements between one of said modulating elements and said light ray means, and means responsive to inequalities in light rays modulated by said modulating elements in association with said optical system for moving the other of said modulating elements relative to first named element until the light rays modulated by said elements are of matched intensity.

19. In combination, two elements having different light modulation characteristics arranged in cooperative relation to modulate light rays reaching the same, an optical system associated with said elements and including means to project light rays toward said elements for modulation thereby, variable mechanical input means for moving one of said optical elements relative to the other, other variable mechanical input means for producing relative movements between a portion of said optical system and said modulating elements, and means responsive to inequalities of light rays modulated by said elements in association with said optical system for effecting further relative movements between said modulating elements until said modulated light rays are of matched intensity.

20. In combination, two elements having different light modulation characteristics, means to project light rays toward said two elements, a reflecting medium receiving said rays after being modulated by said elements, variable mechanical input means to effect relative movements between one of said modulating elements and said light ray means, and means responsive to inequalities of light rays reaching said reflecting medium from said modulating elements to produce relative movements between said modulating elements until the light rays are reflected by said medium with matched intensity.

21. In combination, two elements of different light modulation characteristics arranged in cooperative relation to modulate light rays reaching the same, an optical system associated with said elements for projecting rays of light toward the same and including light ray means and a reflecting medium, means to vibrate said reflecting medium, means to effect relative movements between one of said modulating elements and said light ray means while said reflecting medium is vibrating, and means responsive to inequalities in intensity of light reaching said reflecting medium from said modulating elements for moving the other modulating element relative to the first named element until the light rays modulated by said elements are of matched intensity.

22. In combination, two elements having surfaces of different light reflecting characteristics, mechanical input and output means each moving one of said elements relative to the other, an optical assembly associated with said elements and including a light reflector and means for projecting rays of light onto said reflector, mechanical input means for moving said light projecting means relative to said reflecting elements and to said reflector, and the means responsive to inequalities in the intensities of light reflected by said reflecting elements from said reflector to operate said output means until the reflected light from said elements is of matched intensity.

23. In combination, two elements having different light modulation characteristics, an optical assembly for projecting light rays toward said modulating elements, means for effecting relative movement between said modulating elements, other means to produce relative movement between the latter elements and said optical assembly, and means responsive to inequalities in intensity of light rays affected by said modulating elements for continuing the movement of one of said elements relative to the other until the light rays modulated by said elements are of matched intensity.

24. In combination, two elements having different light modulation characteristics, an optical assembly for projecting light rays toward said modulating elements, means for effecting relative movement between said modulating elements, other means to produce relative movement between the latter elements and said optical assembly, and light sensitive means responsive to inequalities in intensity of light rays affected by said modulating elements for continuing the movement of one of said elements relative to the other until the light rays modulated by said elements are of matched intensity.

25. In combination, two cooperating elements having different light modulation characteristics, means to variably move said elements relative to each other, means to project light rays toward said elements, and means responsive to inequalities in the intensity of the projected rays modulated by said elements for continuing said relative movement until said modulated rays are of matched intensity.

26. In combination, two light modulating elements, one having different modulation characteristics at points ranging both circumferentially and axially thereof and the other element having different modulation characteristics ranging circumferentially thereof, light sensitive means responsive to the light modulation characteristics of both said elements, and variably operable means for relatively moving said modulating elements and said light sensitive means until the light modulation characteristics of both said elements affecting said light sensitive means are of matched intensity.

27. In combination, two light modulating elements, one having arbitrarily varying modulation characteristics at points ranging both circumferentially and axially thereof and the other element having arbitrarily varying modulation characteristics ranging circumferentially thereof, light sensitive means responsive to the light modulation characteristics of both said elements, and variably operable means for relatively moving said modulating elements and said light sensitive means until the light modulation characteristics of both said elements affecting said light sensitive means are of matched intensity.

EARL E. LIBMAN.
HENRY LEHDE.